May 11, 1943.  D. CRAIG  2,318,988
PURIFICATION OF BUTADIENE
Filed Oct. 16, 1940
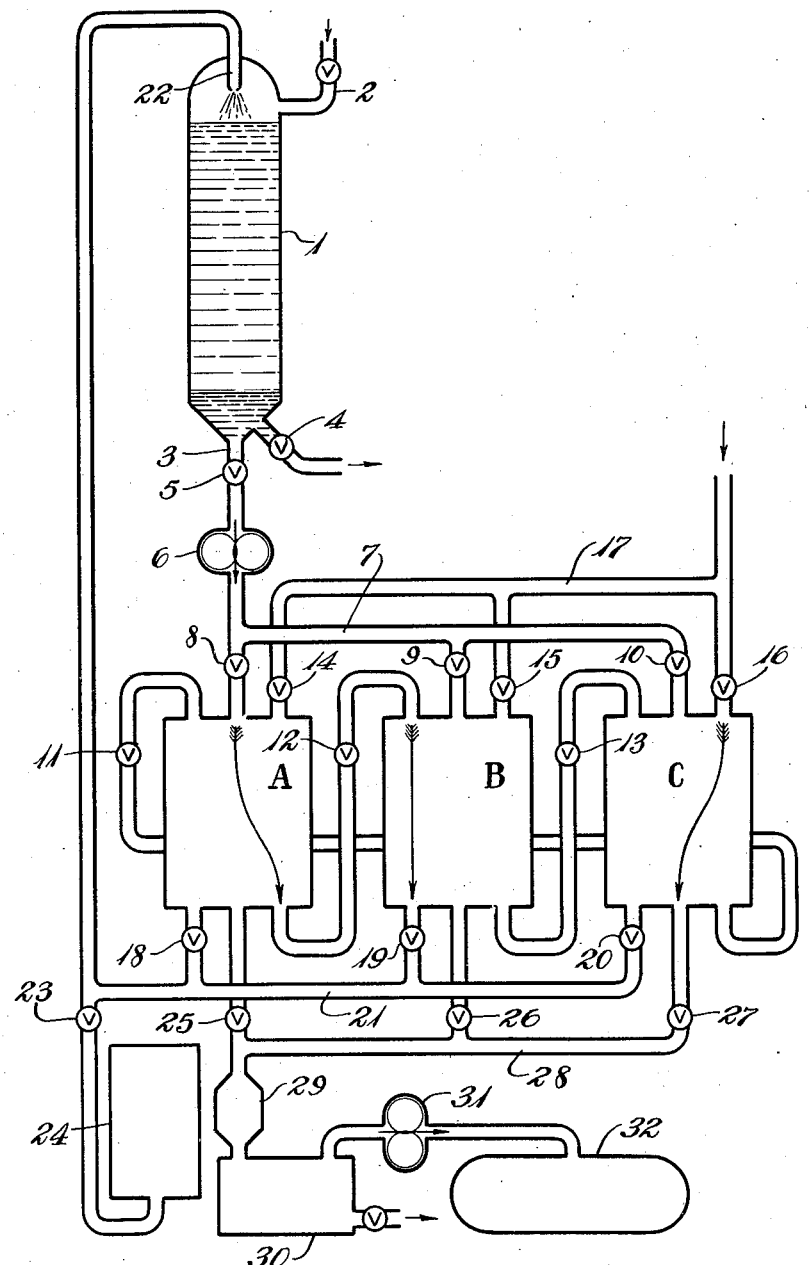
Inventor
David Craig
By Willis F. Avery Patented May 11, 1943

2,318,988

UNITED STATES PATENT OFFICE 2,318,988

PURIFICATION OF BUTADIENE

David Craig, Cuyahoga Falls, Ohio, assignor to The B. F. Goodrich Company, New York, N. Y., a corporation of New York Application October 16, 1940, Serial No. 361,358

5 Claims. (Cl. 260—680)

This invention relates to the purification of butadiene and has as its object the quantitative separation of butadiene from other hydrocarbons of similar boiling point such as the isomeric butanes and butenes.

It has long been known that butadiene can be obtained by cracking or pyrolysis of hydrocarbons such as petroleum fractions, but the butadiene so produced is invariably accompanied by large volumes of other hydrocarbons of similar boiling point, principally butanes and butenes, from which the butadiene cannot readily be separated by distillation. As a means of overcoming this difficulty it has been proposed to bring the mixture in contact with a cuprous salt which preferentially reacts with butadiene to form a complex from which the butadiene can be regenerated by heating; but processes of this type heretofore proposed have involved contact of gaseous hydrocarbon with a solution of cuprous salt, in which complete recovery of butadiene is difficult to attain because of the difficulty of securing effective contact of gas and liquid without inducing excessive foaming, or have involved contact of liquefied hydrocarbon with a suspension of solid cuprous salt, in which case some of the butene is absorbed along with the butadiene and a sharp separation is difficult to accomplish.

I have discovered that by mixing a liquid hydrocarbon mixture containing butadiene with a solution of a cuprous salt, it is possible to precipitate practically all the butadiene, without any appreciable quantity of the butenes, as a solid complex, and that by mechanically separating the precipitated solid from the liquids and then dissociating it, an almost quantitative yield of very pure butadiene can be secured. The high purity of this product is of the greatest value in the manufacture of synthetic rubber-like polymers, for impure butadiene is not satisfactory for this purpose.

While cuprous chloride has the power to form complexes with a great many materials, including, in addition to butadiene and other conjugated diolefines, not only acetylene hydrocarbons but also simple olefines, as well as carbon monoxide, the process of this invention permits of the production of butadiene practically free from other hydrocarbons. The preliminary fractional distillation which ordinarily precedes any process for isolating butadiene, eliminates practically all materials other than 4-carbon hydrocarbons. The mixtures of 4-carbon hydrocarbons obtained from petroleum by pyrolysis do not contain perceptible quantities of any unsaturated hydrocarbons other than butadiene 1,3 (herein called simply "butadiene") and the various isomeric butenes. It happens that the butadiene cuprous chloride complex is almost insoluble in water and in cuprous chloride solutions, whereas the butene cuprous chloride complexes are soluble. On the other hand, the dissociation pressure of the butene complex at convenient operating temperatures is much higher than that of the butadiene complex. The result of these factors is that when liquid mixtures of butadiene and butenes (usually accompanied also by the still more inert butanes) are reacted with cuprous chloride solutions, almost all of the butadiene forms an insoluble complex, whereas such of the butene complex as is formed remains in solution. It is then only necessary to separate the precipitated butadiene complex by filtration or other mechanical means, and dissociate it by warming, to obtain butadiene of high purity.

As a specific example of one embodiment of this invention, an apparatus such as that illustrated diagrammatically in the accompanying drawing may be used. This apparatus includes a reaction chamber 1 provided with a charging inlet 2, and outlet 3, and a second outlet provided with a valve 4 used to withdraw residual hydrocarbon, while the outlet 3 with its valve 5 is used to withdraw the extracting liquid, which is then forced by pump 6 to manifold 7, whence it passes through one of the valves 8, 9, 10 into one of the filters A, B and C. These filters are each provided with three inlets and three outlets. One of the inlets of each filter is connected to manifold 7 as has just been described. Another of the inlets is connected to an outlet of an adjacent filter through pipes containing the respective valves 11, 12, 13. The remaining inlets are connected through valves 14, 15, 16 to manifold 17 which is connected to a source of steam. Of the outlets of the filters, one, as has already been mentioned, is connected to an inlet of an adjacent filter. Another outlet of each filter is connected through valves 18, 19, 20 to a manifold 21 which returns the liquid to a nozzle 22 at the top of the reaction chamber 1. A branch of this manifold is connected through valve 23 to a reservoir 24. The remaining outlets are connected through valves 25, 26, 27 to a manifold 28 which leads through a condenser 29 to a liquid separator 30 from which the gas passes through compressor 31 to storage tank 32.

In the practice of the invention valves 4, 9, 10, 11, 13, 14, 15, 18, 20, 23, 25 and 26 may be closed and valves 5, 8, 12, 16, 19 and 27 opened.

The filter B is charged with solid cuprous chloride sufficient to combine with the entire butadiene content of one batch of crude butadiene, and the reaction chamber 1 is charged with a saturated solution of cuprous chloride of sufficient volume to fill the piping, the free space of filters A and B, and leave a pool in the bottom of the reaction chamber. The crude butadiene is then charged in reaction chamber 1 through inlet 2, and circulation of the cuprous chloride solution is established by means of pump 6. The cuprous chloride solution is sprayed through the nozzle 22 into the crude butadiene, whereupon it reacts with the formation of a solid butadiene cuprous chloride complex, which sinks to the bottom along with the spent solution and is pumped into filter A. The course of the liquid through the filters with the valves set as indicated above is designated by the arrows. The filtered spent solution leaving filter A is no longer saturated with cuprous chloride since much of the dissolved cuprous chloride is used up in the formation of the complex, but in passing through filter B it redissolves cuprous chloride and is then recirculated to the nozzle 22. The circulation is continued until precipitation of the butadiene cuprous chloride complex is completed, then valve 23 is opened, permitting the solution to drain into reservoir 24. As soon as the boundary between the solution and the hydrocarbon layer reaches valve 5 that valve is closed, valves 19 and 23 are closed, and the exhausted hydrocarbon mixture is withdrawn from the reaction chamber 1 through valve 4. Valve 4 is then closed and valves 23 and 19 are reopened. If the extraction is carried out under pressure, as will usually be the case because of the low boiling point of the 4-carbon hydrocarbons, the reaction chamber 1 may be blown down to atmospheric pressure, whereupon dissolved gases escaping from the solution in filters A and B and in reservoir 24 will blow the solution (as soon as valves 19 and 23 are reopened) back into the reaction chamber 1. In the meantime, a previous batch of butadiene cuprous chloride complex in filter C is being dissociated by blowing steam through manifold 17 and valve 16 to heat the complex in filter C, the steam and liberated butadiene passing through valve 27, manifold 28, condenser 29 to separator 30, whence the butadiene vapor is withdrawn by compressor 31 and stored in tank 32. This leaves filter A filled with butadiene cuprous chloride complex, filter B practically empty and filter C partially filled with regenerated solid cuprous chloride. The apparatus is then ready for another batch, which is extracted by closing valves 4, 8, 10, 11, 12, 15, 16, 18, 19, 23, 26 and 27, opening valves 5, 9, 13, 14, 20 and 25, charging the crude butadiene as before, and circulating the solution, the complex being collected in filter B, the cuprous chloride redissolved from filter C, while the complex in filter A is dissociated. The third batch is run by collecting the complex in filter C, redissolving the cuprous chloride from filter A and dissociating the complex in filter B. The fourth batch is run like the first, and so on.

The process can be varied in numerous ways. For instance, one of the three filters can be omitted, in which case the complex will be dissociated in the interval between successive extractions. Or a single filter may be used, in which case the volume of aqueous solution must be sufficient to dissolve the entire quantity of cuprous chloride necessary to precipitate the butadiene.

Another variation is to warm the cuprous chloride solution in reservoir 24 to drive off dissolved gases before the next batch is run. In the process as described above, the cuprous chloride solution remains continuously saturated with the impurities contained in the crude butadiene, and this does no harm if the impurities consist only of butylenes and butanes. However, if the crude butadiene contains materials capable of forming insoluble complexes with cuprous chloride such as acetylene hydrocarbons it may be desirable to drive all hydrocarbons out of the system periodically to prevent accumulation of and possible contamination of the product by unwanted materials.

The process may even be carried out continuously by introducing the liquid crude butadiene as a fine spray near the bottom of the reaction vessel, so that it can rise through the cuprous chloride solution which is continuously introduced at the top. The extracted hydrocarbons are then withdrawn at the top, while the cuprous chloride solution and the precipitated butadiene cuprous chloride complex are withdrawn at the bottom and pumped successively through a filter to collect the complex and through a bed of cuprous chloride to resaturate the solution, in the manner described above. When the filter is full it is switched out of the cycle and its contents dissociated by heat as before.

In all of these modifications the preferred reagent is cuprous chloride but other equivalent cuprous salts such as the bromide or formate may of course be substituted. Since cuprous chloride is almost insoluble in water it is generally advisable to add an acid, base or salt such as hydrochloric acid, ammonia, a water soluble amine or salt thereof, ammonium chloride, sodium chloride, calcium chloride or the like to increase the solubility of the cuprous chloride. These materials, however, compete with the butadiene for possession of the cuprous chloride by forming addition complexes themselves, hence an excess of any of them reduces the absorption of butadiene, and may even prevent the formation of the desired precipitate, hence any such excess should be avoided as far as possible. To put it another way, the solution should be as nearly saturated with cuprous chloride as possible when it is brought into contact with the butadiene.

It is at present preferred to employ a moderately concentrated solution of cuprous chloride in ammonium chloride solution. Such a solution may contain 20% ammonium chloride, and 20% cuprous chloride and should be slightly acid. Such a solution when brought into intimate contact with liquid 30% butadiene in the manner described in detail above will precipitate more than nine-tenths of the butadiene, which is regenerated on warming as 95 to 98% pure butadiene.

I claim:

1. The process of purifying butadiene which comprises bringing an aqueous solution of a cuprous salt into contact with a liquid mixture of butadiene and butene, separating the aqueous solution and filtering it to remove the precipitated butadiene complex, heating the complex to regenerate solid cuprous salt and liberate purified gaseous butadiene, and bringing the filtered solution containing such butene as may have been dissolved in it into contact with solid cuprous salt to resaturate it for re-use.

2. The process of purifying butadiene which comprises bringing an aqueous solution of cuprous chloride into contact with a liquid mixture of butadiene and butene, separating the aqueous solution and filtering it to remove the precipitated butadiene complex, heating the complex to regenerate solid cuprous chloride and liberate purified gaseous butadiene, and bringing the filtered solution containing such butene as may have been dissolved in it into contact with solid cuprous chloride to resaturate it for re-use.

3. The process of purifying butadiene which comprises bringing an aqueous solution of cuprous chloride into contact with a liquid mixture of butadiene and butene, separating the aqueous solution and filtering it to remove the precipitated butadiene complex, bringing the filtered solution containing such butene as may have been dissolved in it into contact with solid cuprous chloride to resaturate it for re-use, and periodically heating the filtered complex to regenerate solid cuprous chloride and liberate purified gaseous butadiene and altering the flow of the filtered solution to pass in contact with freshly regenerated cuprous chloride.

4. The process of purifying butadiene which comprises bringing an aqueous solution of cuprous chloride into contact with a liquid mixture of butadiene and butene, separating the aqueous solution and filtering it to remove the precipitated butadiene complex, bringing the filtered solution containing such butene as may have been dissolved in it into contact with previously regenerated solid cuprous chloride to resaturate it and recirculating it in contact with the liquid mixture of butadiene and butene, and periodically removing the filtered complex from contact with the circulating solution and heating it to regenerate solid cuprous chloride and liberate purified gaseous butadiene, accumulating a new batch of filtered complex and bringing filtered solution in contact with another batch of cuprous chloride regenerated in a previous cycle.

5. The process of purifying butadiene which comprises bringing an aqueous solution of cuprous chloride into continuous countercurrent contact with a liquid mixture of butadiene and butene, separating the aqueous solution and filtering it to remove the precipitated butadiene complex, bringing the filtered solution containing such butene as may have been dissolved in it into contact with previously regenerated solid cuprous chloride to resaturate it and recirculating it in contact with the liquid mixture of butadiene and butene, and periodically removing the filtered complex from contact with the circulating solution and heating it to regenerate solid cuprous chloride and liberate purified gaseous butadiene, accumulating a new batch of filtered complex and bringing filtered solution in contact with another batch of cuprous chloride regenerated in a previous cycle.

DAVID CRAIG.